June 6, 1950          C. F. NORLIN          2,510,754
PORTABLE LUGGAGE HAVING RETRACTABLE WHEELS
Filed Nov. 18, 1947          2 Sheets-Sheet 1
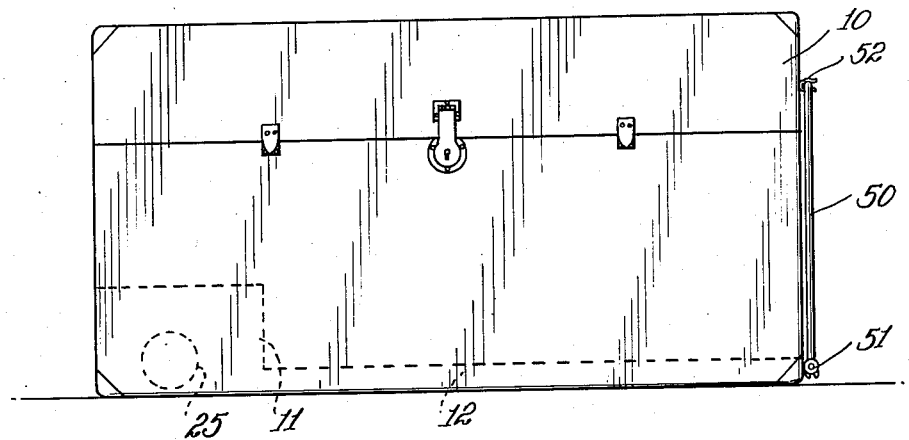
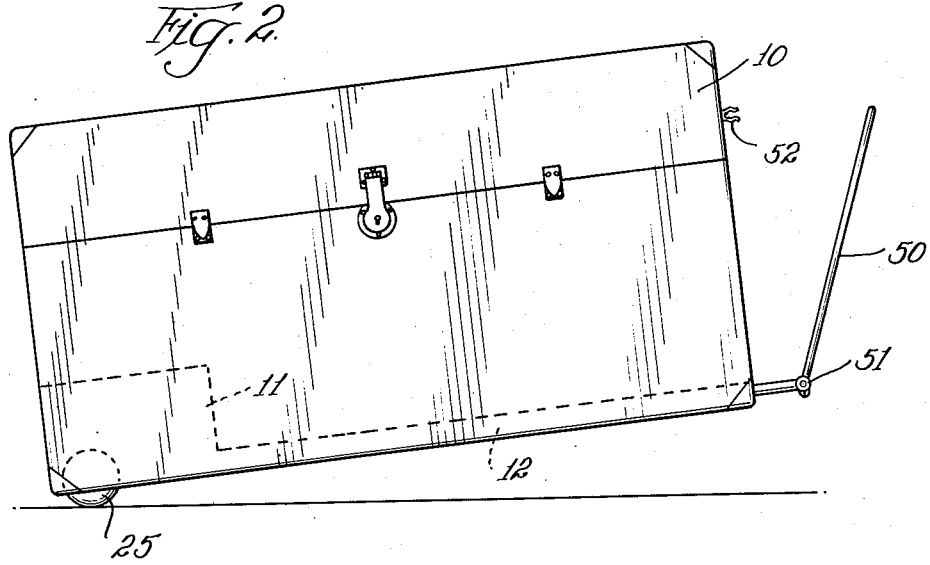
INVENTOR.
Clarence F. Norlin
BY
Agent

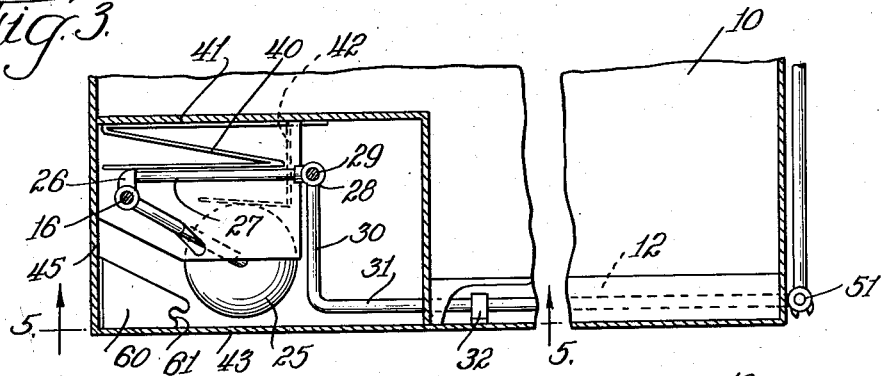
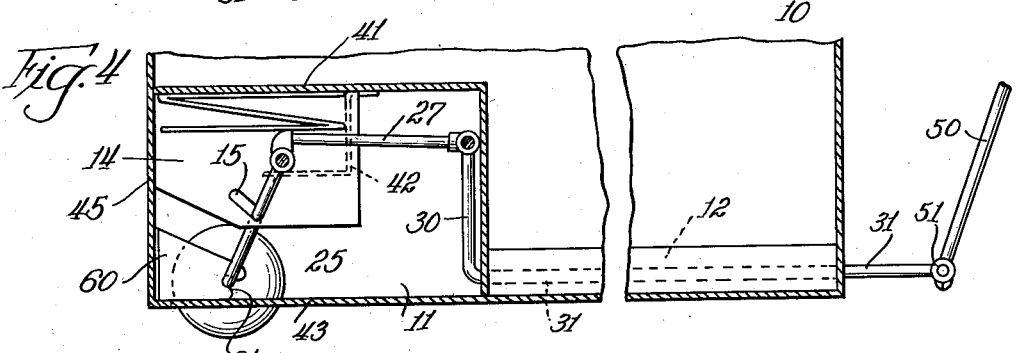
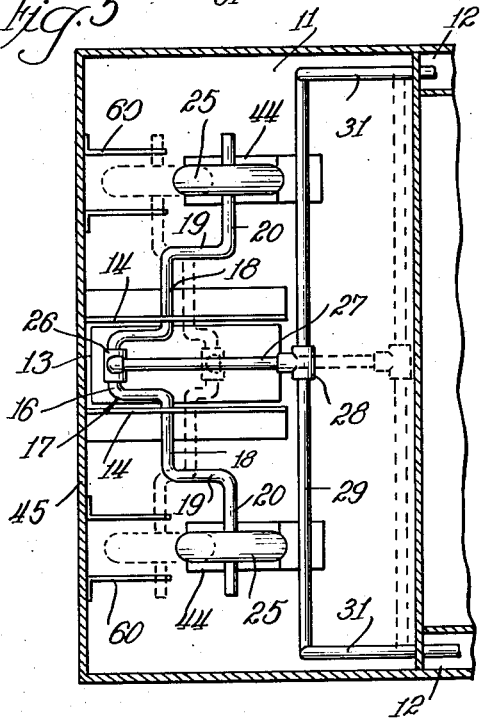

Patented June 6, 1950

2,510,754

UNITED STATES PATENT OFFICE 2,510,754

PORTABLE LUGGAGE HAVING RETRACTABLE WHEELS

Clarence F. Norlin, Chicago, Ill.

Application November 18, 1947, Serial No. 786,750

1 Claim. (Cl. 280—38)

This invention pertains to new and useful improvements in portable luggage. It seeks to particularly provide luggage of the type having disappearing wheels at one end upon which the luggage, if desired, may be supported and wheeled, thereby eliminating necessity for its being carried from place to place, and which, due to the disappearing characteristics of the wheels has, for all practical purposes, the appearance of conventional luggage.

Another object of the invention is to provide wheelable luggage, the wheels of which may be caused to disappear, wherein the structure is such as to have nearly the capacity of a standard piece of the same external dimensions.

Still other and further objects and advantages of the invention will be apparent from the detailed description which follows and from the drawings in which:

Fig. 1 is a side elevational view of a typical piece of luggage incorporating the structure of the invention with the wheels in retracted position;

Fig. 2 is a side elevational view of the showing of Fig. 1 with the wheels shown in extended position;

Fig. 3 is a fragmentary cross-sectional view taken medially longitudinally of a piece of luggage, showing the luggage-supporting wheels in retracted condition;

Fig. 4 is a view taken in the same manner as Fig. 3 showing the luggage-supporting wheels in extended position;

Fig. 5 is a sectional view illustrative of the structure permitting extension and retraction of the article-supporting wheels taken along the line 5—5 of Fig. 3 and looking in the direction of the arrows; and Fig. 6 is an end view of a piece of luggage showing a typical end-mounted handle which serves the dual purposes of operating the structure of the invention and providing a means whereby the luggage may be pulled from place to place on its wheels in the manner shown in Fig. 2.

Referring now to the drawings, reference numeral 10 indicates generally a piece of luggage which may be a trunk, suitcase or the like, the luggage having at its one end a compartment 11, closed off from the interior of the luggage, in which compartment the hereinafter described wheel retracting and extending mechanism is placed. As best shown in Fig. 5, two parallel other compartments 12, 12 are formed along each opposite lower longitudinal edge of the luggage and communicate with compartment 11, forming passageways for longitudinal movement of those hereinafter described handle-connected rods which control retraction and extension of the wheels.

Still referring to Fig. 5, positioned medially of the width of compartment 11 is a generally rectangular frame or housing 13 which has opposed parallel side walls 14, 14 in each of which is formed a diagonally disposed forwardly and downwardly extending slot 15 in which the hereinafter described eccentric axle may swing. Slots 15, 15 (only one of which appears on the drawings) are in direct cross register with one another.

Positioned within housing walls 14, 14 is the generally U-shaped eccentric portion 16 of an eccentrically shaped unitary axle generally indicated by reference numeral 17. Extending outwardly in opposite directions from U-shaped axle portion 16 are opposed arms 18, 18 at generally right angles to such U-shaped portion. Arms 18, 18 adjacent their juncture with U-shaped portion 16 pass through frame sidewall slots or openings 15, 15, in the retracted position of the axle, each arm finding supporting abutment on the uppermost end of such slots and in the extended position of the axle finding supporting abutment on the lowermost end of such slots. Spaced outwardly a slight distance from their engagement with slots 15, 15, arms 18, 18 each merge with a right-angled portion 19, such portions 19 being generally parallel with each other, and each portion 19 merges with an outwardly directed arm 20, as shown in Fig. 5. Each outwardly directed arm 20 has rotatably mounted on it, in suitable conventional manner, one of a pair of aligned luggage-supporting wheels 25, 25.

Mounted for movement on medial axle U-shaped portion 16 is a connecting member 26, connected to and extending forwardly from which in parallel relation to frame walls 14, 14, is a connecting rod 27. At the fore-end of rod 27 is a connector 28 which is medially attached to a transversely extending rod 29, the length of which is slightly short of the width dimension of the luggage. At each of its ends rod 29 is bent downwardly as at 30 and is attached to one of a pair of forwardly extending rods, each designated by reference numeral 31. Rods 31, 31 are housed in forwardly extending compartments 12, 12 along the longitudinal bottom side edges of the luggage and are guided therein by guides, one of which, indicated by reference numeral 32, is shown in Fig. 3.

As shown in Figs. 3 and 4, a flat metal expansion spring 40, of about the width of the space between frame walls 14, 14, is located between said walls, finding abutment at its top along the top wall 41 of compartment 11 and with the surface forming its other end in constant abutment with connector 26 and rod 27 in all positions of the latter. At the fore-end of frame 13 is a rearwardly directed L-shaped spring-like supporting structure 42 for the U-shaped portion 16 of axle 17 in the extended position of the wheels. As shown in Fig. 4, when the wheels are extended, the lower surfaces of connector 26 abut and find resilient support upon the upper surfaces of such L-shaped structure.

Rods 31, 31 extend forwardly in parallel relation, as shown on the drawings, to terminate exteriorly of the body of the luggage in hinged conections 51, 51 by which they are attached to a U-shaped handle 50. Handle 50 in its unextended position reposes in coplanar relation to the end of the luggage, as shown in Fig. 3, being so held by a suitable clip 52. The hinged connection between the lower ends of handle 50 and rods 31, 31 is preferably so formed that the arc of forward swing of the handle is limited to not in excess of about 45° from vertical.

Assuming the parts are in the retracted position shown in Fig. 3, when handle 50 is loosened from engagement with clip 52 and pressure is exerted between the handle and the luggage, rods 31, 31 may be slid in a forward direction in compartments 12, 12, being guided in such movement by the guides such as that one typically shown in Fig. 3 and indicated by reference numeral 32. This forward movement is imparted by transverse rod 29 to longitudinally extending rod 27 which in its forward movement, by reason of the eccentric formation of axle 17 and the interconnected relation of the axle and rod 29, pulls the axle structure forwardly. During the forward movement of axle 17, its arms 18, 18 follow the contour of slots 15, 15, first assuming a vertical position, then assuming the forwardly inclined position shown with respect to them in Fig. 4. The entire axle assembly, in being put through the above described movement, is operated in the nature of a crank, and first compresses spring 40, under the urging of which the axle is forced downwardly and forwardly in slots 15, 15, then is rotated through a relatively wide arc until the axle assumes a forwardly directed upright angle. At all times, whether in retracted position of the wheels (Fig. 3) or extended position of the same (Fig. 4), spring 40 exerts constant downwardly directed force on axle U-shaped portion 16 and forwardly extending connecting rod 27. In the retracted position of the wheels, this force is exerted to hold the axle in an upwardly and rearwardly directed position, and in extended position of the wheels this spring-induced force is utilized to hold the axle in an upwardly and forwardly directed position in abutment with supporting structure 20. To accommodate the passage therethrough of wheels 25, 25, when extended, the bottom wall 43 of compartment 11 is provided with appropriate openings 44, 44 (Fig. 5).

To adequately support axle 17 during extended condition of wheels 25, 25, generally U-shaped brackets 60, 60 are provided. Brackets 60, 60 are mounted on end wall 45 of compartment 11 and partially encompass each wheel in the extended position of the wheels. The outer ends of each bracket 60 are provided with somewhat downwardly angularly directed re-entrant notches 61, 61 which, in the extended condition of the wheels, engage each arm 20 of axle 17 at both sides of each wheel. It will be obvious that by the immediately hereinabove described structure, the wheel-bearing axle portions will be adequately supported against deflection when the wheels are extended.

It will be obvious from the drawings and the above description that I have provided a unique construction for luggage which, when the wheels are retracted, differs but little from the appearance of a conventional piece of luggage. The construction I have disclosed takes away but little from the capacity of the luggage. The wheels are firmly held in retracted position and adequately supported, when extended, to bear the load of the luggage. The unique handle construction makes it possible to transport the luggage without it having the tendency to or appearance of a pulled article such as a wagon or trailer might have.

Having shown and described my invention in considerable detail, I do not wish this particularity to be taken in other than an illustrative sense, desiring to be limited only as I may be by the scope of the appended claim.

I claim:

In luggage, a compartment at one lower end of the luggage and closed off from the interior thereof; a frame in said compartment having side portions in which are provided forwardly and downwardly directed aligned slots; an eccentric axle supported by said frame, portions of said axle being slidably supported in said slots; opposed wheels on the end of said axle; and means for swinging said axle through a wide arc longitudinally of the luggage for retracting said wheels within and extending said wheels exteriorly of said compartment at will.

CLARENCE F. NORLIN.

REFERENCES CITED

The following references are of record in the file of this patent:

UNITED STATES PATENTS

| Number | Name | Date |
| --- | --- | --- |
| 44,936 | Clapp | Nov. 8, 1864 |
| 1,895,677 | Pinheiro | Jan. 31, 1933 |
| 2,002,836 | Rossi | May 28, 1935 |
| 2,395,769 | Thornton | Feb. 26, 1946 |
| 2,439,660 | Keil | Apr. 13, 1948 |